United States Patent
Moon et al.

(10) Patent No.: US 12,547,001 B2
(45) Date of Patent: Feb. 10, 2026

(54) WAVEGUIDE OPTICAL DEVICE AND NEAR-EYE DISPLAY APPARATUS INCLUDING THE SAME

(71) Applicant: SAMSUNG ELECTRONICS CO., LTD., Suwon-si (KR)

(72) Inventors: Seokil Moon, Suwon-si (KR); Changkun Lee, Seoul (KR); Geeyoung Sung, Daegu (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 638 days.

(21) Appl. No.: 17/751,133

(22) Filed: May 23, 2022

(65) Prior Publication Data
US 2023/0161160 A1    May 25, 2023

(30) Foreign Application Priority Data
Nov. 25, 2021  (KR) .................. 10-2021-0164868

(51) Int. Cl.
*G02B 27/01*  (2006.01)
*F21V 8/00*  (2006.01)

(52) U.S. Cl.
CPC ....... *G02B 27/0172* (2013.01); *G02B 6/0036* (2013.01); *G02B 2027/011* (2013.01)

(58) Field of Classification Search
CPC .............. G02B 27/0172; G02B 6/0036; G02B 2027/011
See application file for complete search history.

(56) References Cited

U.S. PATENT DOCUMENTS

| | | | |
|---|---|---|---|
| 6,402,795 B1 | 6/2002 | Chu et al. | |
| 6,485,622 B1 | 11/2002 | Fu | |
| 6,805,490 B2 * | 10/2004 | Levola | G02B 5/1866 359/24 |
| 7,901,658 B2 | 3/2011 | Weppner et al. | |
| 8,320,032 B2 * | 11/2012 | Levola | G02B 27/0081 359/13 |
| 8,508,848 B2 * | 8/2013 | Saarikko | G02B 5/1814 359/567 |
| 8,828,580 B2 | 9/2014 | Visco et al. | |

(Continued)

FOREIGN PATENT DOCUMENTS

| | | |
|---|---|---|
| KR | 1020030088567 A | 11/2003 |
| WO | 2017/039820 A1 | 3/2017 |

(Continued)

OTHER PUBLICATIONS

Extended European Search Report dated Apr. 5, 2023, issued by European Patent Office in European Patent Application No. 22208927.8.

(Continued)

*Primary Examiner* — Peter Radkowski
(74) *Attorney, Agent, or Firm* — Sughrue Mion, PLLC

(57) ABSTRACT

Provided are a waveguide optical device and a near-eye display apparatus including the same. The waveguide optical device includes a waveguide that propagates light, an input coupler that inputs the light into the waveguide, and an output coupler that outputs the light propagating in the waveguide to the outside, wherein the output coupler includes a plurality of grating regions, which are arranged to be spaced apart from each other.

11 Claims, 7 Drawing Sheets

(56) References Cited

U.S. PATENT DOCUMENTS

| | | | | |
|---|---|---|---|---|
| 9,658,453 B1* | 5/2017 | Kress | | G02B 5/1861 |
| 10,095,045 B2* | 10/2018 | Robbins | | G02B 27/4261 |
| 10,838,132 B1* | 11/2020 | Calafiore | | G02B 6/0015 |
| 2004/0062502 A1* | 4/2004 | Levola | | G02B 5/1866 |
| | | | | 385/37 |
| 2006/0132914 A1* | 6/2006 | Weiss | | G02B 30/40 |
| | | | | 359/462 |
| 2010/0214659 A1* | 8/2010 | Levola | | G02B 6/0035 |
| | | | | 359/566 |
| 2010/0296163 A1* | 11/2010 | Saarikko | | G02B 5/1814 |
| | | | | 359/569 |
| 2012/0012754 A1* | 1/2012 | Kaneko | | G02B 5/1871 |
| | | | | 359/570 |
| 2017/0112376 A1* | 4/2017 | Gill | | G02B 5/1871 |
| 2018/0006326 A1 | 1/2018 | O'Neill et al. | | |
| 2018/0052277 A1 | 2/2018 | Schowengerdt et al. | | |
| 2018/0074340 A1* | 3/2018 | Robbins | | G02B 27/0172 |
| 2018/0074457 A1* | 3/2018 | Jolly | | G03H 1/2645 |
| 2018/0284466 A1 | 10/2018 | Moebius et al. | | |
| 2019/0191993 A1* | 6/2019 | Gill | | G06T 3/4053 |
| 2019/0243142 A1 | 8/2019 | TeKolste et al. | | |
| 2020/0328459 A1 | 10/2020 | Sakai et al. | | |
| 2020/0341280 A1 | 10/2020 | Bablumyan et al. | | |
| 2021/0088791 A1 | 3/2021 | Olkkonen et al. | | |

FOREIGN PATENT DOCUMENTS

| | | |
|---|---|---|
| WO | 2017039750 A1 | 3/2017 |
| WO | 2019066873 A1 | 4/2019 |
| WO | 2019135319 A1 | 7/2019 |

OTHER PUBLICATIONS

Kress et al., "Waveguide combiners for mixed reality headsets: a nanophotonics design perspective", Nanophotonics, Oct. 7, 2021, pp. 41-74, vol. 10.

* cited by examiner

WAVEGUIDE OPTICAL DEVICE AND NEAR-EYE DISPLAY APPARATUS INCLUDING THE SAME

CROSS-REFERENCE TO RELATED APPLICATION

This application is based on and claims priority under 35 U.S.C. § 119 to Korean Patent Application No. 10-2021-0164868, filed on Nov. 25, 2021, in the Korean Intellectual Property Office, the disclosure of which is incorporated by reference herein in its entirety.

BACKGROUND

1. Field

The disclosure relates to a waveguide optical device with high uniformity of light, and a near-eye display apparatus including the same.

2. Description of the Related Art

Virtual reality (VR) is a technology that enables a person to experience life in a computer-generated virtual world. Augmented reality (AR) is a technology that allows virtual images to be mixed with physical environments or spaces in the real world. VR displays and AR displays may be implemented by near-eye displays, which focus a virtual image on a space by using a combination of optical and stereoscopic images. In such near-eye displays, display resolution and processing are important.

An AR apparatus, which is an example of a near-eye display apparatus, enables a user to view augmented reality. An example of the AR apparatus ma include augmented reality (AR) glasses. An image optical system of an AR apparatus includes an image generation device for generating an image and a waveguide for guiding the generated image to an eye. Such an AR apparatus has a wide viewing angle and high image quality. However, it is necessary to reduce the weight and size of the apparatus itself.

Recently, waveguide-based optical systems have been studied and developed for AR apparatuses such as AR glasses. In the related art AR devices, light is input into a waveguide by using free-curved surface reflection or multi-mirror reflection, or by using an input-coupling diffractive element such as a diffractive optical element or a holographic optical element. When free-curved surface reflection or multi-mirror reflection is used, the structure may be simple and the optical transmission efficiency may be high, but there is a limitation in the viewing angle and difficulty in reducing the size of the waveguide. In addition, the uniformity of light propagating through the waveguide is low, and accordingly, the image quality may be deteriorated.

SUMMARY

An example embodiment provides a waveguide optical device with improved uniformity of light.

Another example embodiment provides an augmented reality apparatus including a waveguide optical device with improved uniformity of light.

Additional aspects will be set forth in part in the description which follows and, in part, will be apparent from the description, or may be learned by practice of the presented embodiments of the disclosure.

According to an aspect of the disclosure, there is provided a waveguide optical device including: a waveguide including a first surface, and a second surface opposite to the first surface; an input coupler configured to input light into the waveguide; and an output coupler configured to output the light propagating in the waveguide to an outside, wherein the output coupler includes a plurality of grating regions spaced apart from each other.

The input coupler is provided on the first surface, and the output coupler is provided on the second surface.

The plurality of grating regions may be spaced apart from each other in a first direction, in which, the light propagates in the waveguide.

Each of the plurality of grating regions may have a partially cut ring structure, and wherein the plurality of grating regions are spaced apart from each other to constitute a concentric semicircular arrangement structure.

Intervals between the plurality of grating regions may be equal to each other.

Intervals between the plurality of grating regions may decrease in a first direction, in which, the light propagates in the waveguide.

The input coupler may include a plurality of grating regions spaced apart from each other.

The plurality of grating regions of the output coupler may have a two-dimensional array structure.

Intervals between the plurality of grating regions of the output coupler may be about 1 mm to about 5 mm.

Areas of the plurality of grating regions may increase in a first direction, in which, the light propagates in the waveguide.

According to another aspect of the disclosure, there is provided a near-eye display apparatus including: an image processor; a display element configured to emit light for forming an image processed by the image processor; a waveguide included a first surface, and a second surface opposite to the first surface; an input coupler configured to input light into the waveguide; and an output coupler configured to output the light propagating in the waveguide to an outside, wherein the output coupler includes a plurality of grating regions spaced apart from each other.

The input coupler is provided on the first surface, and the output coupler is provided on the second surface.

The plurality of grating regions may be spaced apart from each other in a first direction, in which, the light propagates in the waveguide.

Each of the plurality of grating regions may have a partially cut ring structure, and wherein the plurality of grating regions are spaced apart from each other to constitute a concentric semicircular arrangement structure.

Intervals between the plurality of grating regions may be equal to each other.

Intervals between the plurality of grating regions may decrease in a first direction, in which, the light propagates in the waveguide.

The input coupler may include a plurality of grating regions spaced apart from each other.

The plurality of grating regions of the output coupler may have a two-dimensional array structure.

Intervals between the plurality of grating regions of the output coupler may be about 1 mm to about 5 mm.

Areas of the plurality of grating regions may increase in a first direction, in which, the light propagates in the waveguide.

Efficiencies of the plurality of grating regions may increase in a first direction, in which, the light propagates in the waveguide.

According to another aspect of the disclosure, there is provided a waveguide optical device including: a waveguide including a first surface, and a second surface opposite to the first surface; an input coupler configured to input light into the waveguide, which propagates the light in a first direction; and an output coupler configured to output the light propagating in the waveguide to an outside, wherein the output coupler including: a first region, which is a first grating regions; a second region adjacent to the first region in the first direction, the second region being a first non-grating region; a third region adjacent to the second region in the first direction, the third region being a second grating region; and a fourth region adjacent to the third region in the first direction, the fourth region being a second non-grating region.

A first diffraction efficiency of the first grating region may be less than a second diffraction efficiency of the second grating region.

A first area of the first grating region is smaller than a second area of the second grating region.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
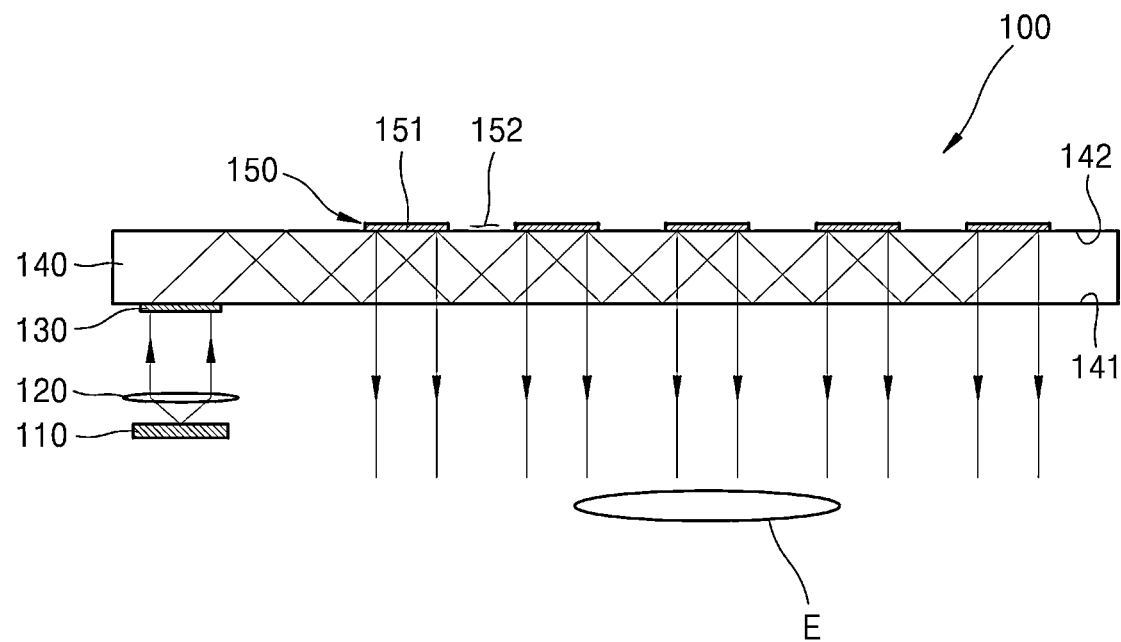
FIG. 1 is a diagram schematically illustrating a near-eye display apparatus according to an example embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, a waveguide optical device and a near-eye display apparatus including the same according to various embodiments will be described in detail with reference to the accompanying drawings. In the following drawings, like reference numerals refer to like elements, and sizes of elements in the drawings may be exaggerated for clarity and convenience of description. Terms such as "first" or "second" may be used to describe various elements, but the elements should not be limited by the terms. These terms are only used to distinguish one element from another element.

The singular expression also includes the plural meaning as long as it is not inconsistent with the context. In addition, when an element is referred to as "including" a component, the element may additionally include other components rather than excluding other components as long as there is no particular opposing recitation. In the following drawings, the size or thickness of each element in the drawings may be exaggerated for clarity of description. Also, when a material layer is referred to as being "on" another substrate or layer, the material layer may be directly on the another substrate or layer, or a third layer may also be present therebetween. In addition, materials constituting each layer in the embodiments below are exemplary, and other materials than the described ones may also be used.

Also, the terms described in the specification, such as " . . . er (or)", " . . . unit", " . . . module", etc., denote a unit that performs at least one function or operation, which may be implemented as hardware or software or a combination thereof.

Particular implementations described in the embodiments are merely exemplary, and do not limit the scope of the present disclosure in any way. For the sake of conciseness, descriptions of related art electronic configurations, control systems, software, and other functional aspects of the systems may be omitted. In addition, the lines or connecting elements between elements shown in the drawings are intended to represent exemplary functional relationships and/or physical or logical couplings between the various elements, and many alternative or additional functional relationships, physical connections or logical connections may be present in a practical device.

The term "the" and other demonstratives similar thereto should be understood to include a singular form and plural forms.

The operations of a method may be performed in any suitable order unless otherwise indicated herein or otherwise clearly contradicted by context. In addition, all example terms (e.g., "such as" or "etc.") are used for the purpose of description and are not intended to limit the scope of the present disclosure unless defined by the claims.

Figure 2:
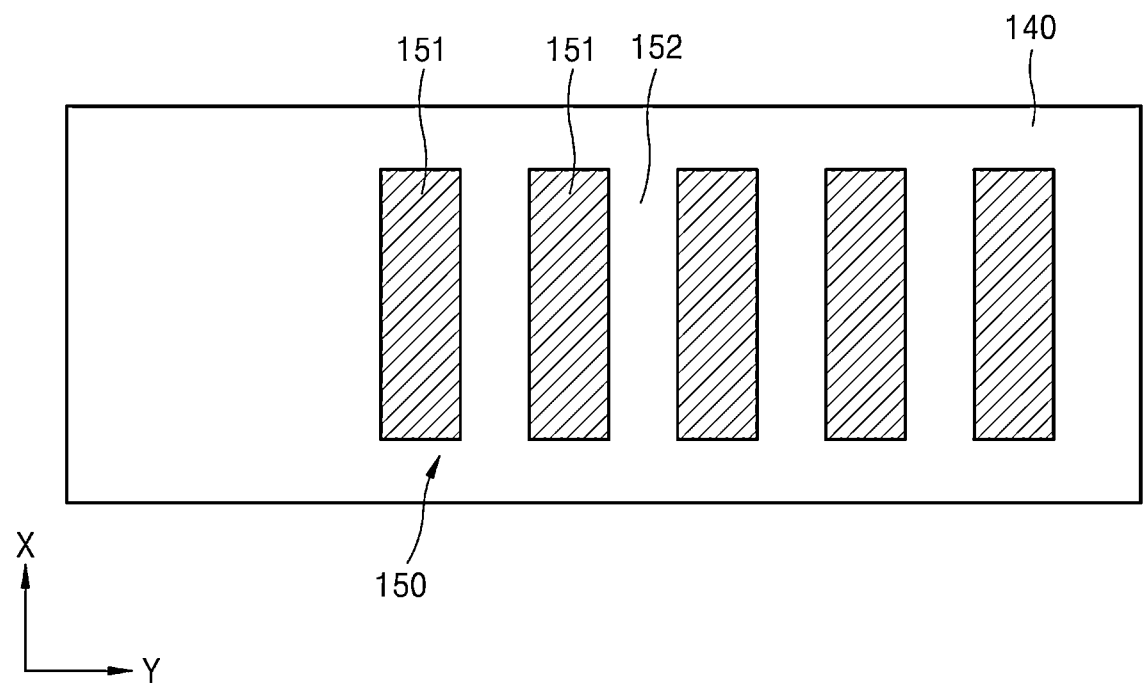
FIG. 2 is a diagram schematically illustrating a waveguide optical device according to an example embodiment.

FIG. 1 is a diagram illustrating a near-eye display apparatus 100 according to an example embodiment, and FIG. 2 is a diagram illustrating a waveguide optical device of the near-eye display apparatus 100.

The near-eye display apparatus 100 includes a display element 110 that emits light for forming an image, a waveguide 140 that guides the light from the display element 110, an input coupler 130 that inputs the light into the waveguide 140, and an output coupler 150 that outputs the light propagating in the waveguide 140 to the outside.

The display element 110 may include a liquid-crystal display (LCD), a liquid crystal on silicon (LCoS) display, an organic light-emitting diode (OLED) display, a light-emitting diode (LED) display, a projector, and the like. The display element 110 may process an image signal to generate a two-dimensional (2D) image or a three-dimensional (3D) image. The display element 110 may include a computer-generated holography (CGH) unit to generate a holographic image. According to an example embodiment, the display element 110 may include a memory and/or a processor configured to process an image signal to generate a two-dimensional (2D) image or a three-dimensional (3D) image generate a holographic image. The display element may be paired with a processor to display images.

The image of an image output from the display element 110 may be incident on the waveguide 140 and then delivered to an eye E of a user through the waveguide 140. In the disclosure, the term 'image' includes a concept of image light for displaying a corresponding image.

The waveguide 140 may include a first surface 141 on which light is incident, and a second surface 142 opposite to the first surface 141. The input coupler 130 may be provided on at least one of the first surface 141 and the second surface 142. FIG. 1 illustrates an example in which the input coupler 130 is provided on the first surface 141. A lens 120 may be further provided between the display element 110 and the input coupler 130. The lens 120 may collimate image light emitted from the display element 110 to be incident on the input coupler 130.

Referring to FIG. 2, the output coupler 150 may include a plurality of grating regions 151. The plurality of grating regions 151 may be spaced apart from each other, and non-grating regions 152 may be provided between the grating regions 151. When the grating regions 151 of the output coupler 130 are discontinuously arranged, brightness uniformity of light propagating through the waveguide 140 may be improved. When the waveguide 140 is applied to a glasses-type near-eye display apparatus, the waveguide 140 may be formed to be significantly thin in a lens portion of the glasses, and accordingly, the wearing convenience of a user may increase.

Meanwhile, the intervals between the grating regions 151 may be equal to each other. However, the disclosure is not limited thereto, and the intervals between the grating regions 151 may not be equal each other. According to an example embodiment, the intervals between the grating regions 151 may decrease in any one of the directions. For example, the intervals between the grating regions 151 may decrease in a direction of propagation of light (e.g., the Y direction). According to an example embodiment, the intervals between the grating regions 151 may gradually decrease in the direction of propagation of light (e.g., the Y direction). For example, an interval between two adjacent grating regions 151 closer to the input coupler 130 may be smaller than an interval between two adjacent grating regions 151 farther away from the input coupler 130 than the two adjacent grating regions 151 that are closer to the input coupler 130. The intervals between the grating regions 151 may be about 1 mm to about 5 mm. Alternatively, the intervals between the grating regions 151 may be about 2 mm to about 4 mm.

Light propagating through the waveguide 140 is diffracted several times, e.g., when it reaches the grating regions 151, before being emitted from the waveguide 140. The diffraction efficiency of the grating regions 151 may be adjusted according to the position of the waveguide 140 in order to adjust the uniformity of light being emitted from the waveguide 140. In an example embodiment, the uniformity of light observed in a particular eye box region may be increased by alternately arranging the grating regions 151 and the non-grating regions 152.

An image may be provided to the user by using diffraction of light in the grating regions 151 and total reflection of light in the waveguide 140. The collimated light may be diffracted by the input coupler 130 at an angle greater than a critical angle, and then propagate through the waveguide 140. Light may be expanded in the first direction (the X direction) by the input coupler 130, and may be expanded in a second direction (the Y direction) by the output coupler 150.

Figure 3:
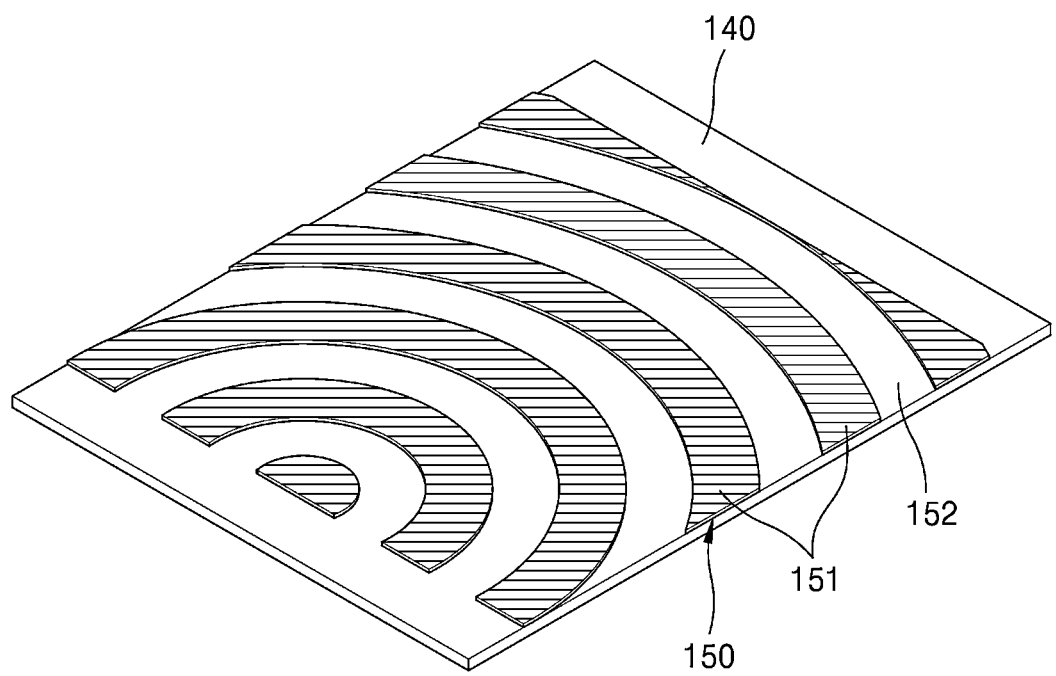
FIG. 3 is a diagram schematically illustrating a waveguide optical device according to another embodiment.

FIG. 3 is a diagram illustrating another example of an arrangement structure of the grating regions 151 of the output coupler 150. The grating region 151 may be arranged in, for example, a structure of partially cut rings. In addition, the grating regions 151 may be arranged to be spaced apart from each other in a concentric semicircular arrangement structure. Also, the grating regions 151 may be configured to have different diffraction efficiencies. For example, the grating regions 151 may be configured such that the diffraction efficiencies of the grating region 151 gradually increase in a direction in which light is guided by the waveguide 140.

In general, in a waveguide having gratings continuously provided in the entire region thereof, when light is totally reflected in the waveguide and then is diffracted in an output coupler, a region of the gratings in the output coupler that the light does not reach may exist according to an incident angle component of the light. Also, part of expanded light may propagate in another direction without reaching the eye box. For this reason, when gratings of an output coupler are continuously provided in a waveguide, the uniformity of light decreases.

In the near-eye display apparatus according to an example embodiment, multiple grating regions 151 of the output coupler 150 may be sparsely arranged to increase the uniformity of light. Specifically, the number of times of reflection may be reduced to increase light uniformity.

Figure 4:
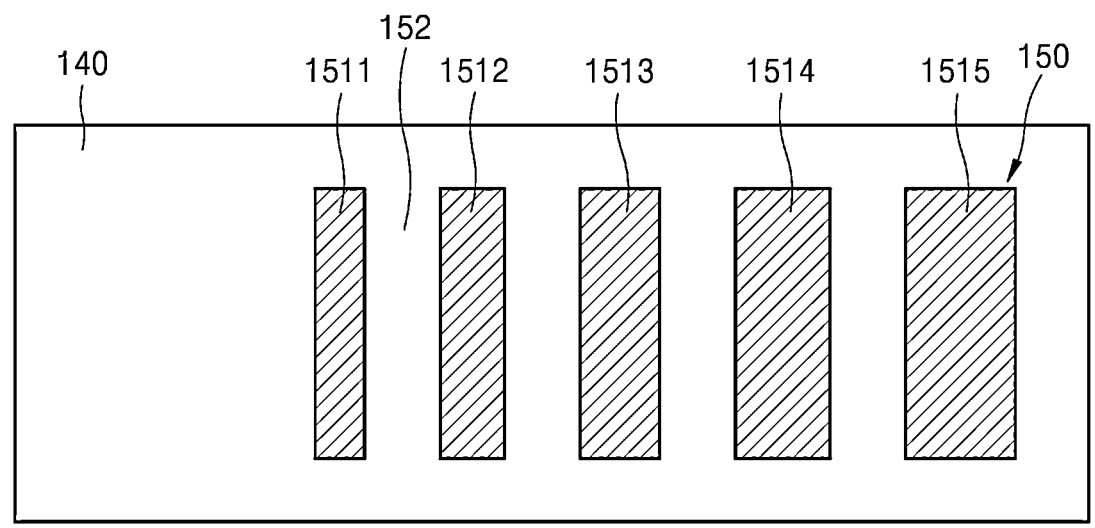
FIG. 4 is a diagram schematically illustrating a waveguide optical device according to another embodiment.
Figure 4:
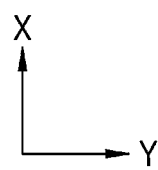

Referring to FIG. 4, the output coupler 150 may include a first grating region 1511, a second grating region 1512, a third grating region 1513, a fourth grating region 1514, and a fifth grating region 1515. The non-grating regions 152 may be provided between the grating regions. The areas of the grating regions may gradually increase in a direction of propagation of light (e.g., the Y direction). For example, the output coupler 150 may be configured to have a relationship of (the area of the first grating region 1511)<(the area of the second grating region 1512)<(the area of the third grating region 1513)<(the area of the fourth grating region 1514)< (the area of the fifth grating region 1515). The spacing of the gratings may also vary in a direction of light propagation.

Alternatively, when the diffraction efficiency of positive first-order diffracted light (or negative first-order diffracted light) of the first grating region 1511 is E1, the diffraction efficiency of the second grating region 1512 is E2, the diffraction efficiency of the third grating region 1513 is E3, the diffraction efficiency of the fourth grating region 1514 is E4, and the diffraction efficiency of the fifth grating region 1515 is E5, a relationship of E1<E2<E3<E4<E5 may be satisfied.

When the output coupler 150 includes six grating regions, the diffraction efficiencies (e.g., E1, E2, E3, E4, E5, and E6) of the six grating regions may be configured as Table 1 below. This is only an example, and the diffraction efficiency of a grating region may be variously configured according to the shape and size of the grating region.

TABLE 1

| | Positive first-order diffraction efficiency (%) | Negative first-order diffraction efficiency (%) | Zero-order diffraction efficiency (%) |
|---|---|---|---|
| E1 | 14 | 14 | 72 |
| E2 | 15 | 15 | 70 |
| E3 | 25 | 25 | 50 |
| E4 | 35 | 35 | 30 |
| E5 | 45 | 45 | 10 |
| E6 | 50 | 50 | 0 |

The direction and period of a grating may be designed to expand incident light in the appropriate direction and angle. The diffraction efficiency of each grating region may be determined by performing an optimization calculation for adjusting brightness uniformity. Referring to Table 1, in the case of the grating regions having the structure illustrated in FIG. 3 are provided, positive first-order diffracted light and negative first-order diffracted light of the grating may be used. As a result of calculating the diffraction efficiency of each grating region, the diffraction efficiency of the first grating region for the positive first-order diffracted light and the negative first-order diffracted light is 14%, and the remaining 72% of the light is totally reflected and is then transferred to the second grating region. The diffraction efficiencies of the second grating region, the third grating region, the fourth grating region, the fifth grating region, and the sixth grating region for the positive first-order diffracted light and the negative first-order diffracted light may be of 15%, 25%, 35%, 45%, and 50%, respectively. In the sixth grating region, the sum of diffraction efficiencies for the positive first-order diffracted light and the negative first-order diffracted light may be 100% in order to diffract all remaining light diffracted by the other previous grating regions.

The area of each grating region may be adjusted by adjusting at least one of the X-direction length and the Y-direction length of the grating region. Here, for example, the X-direction lengths of the grating regions are equal to each other, and the areas of the grating regions may be differently adjusted by respectively adjusting their Y-direction lengths.

Figure 5:
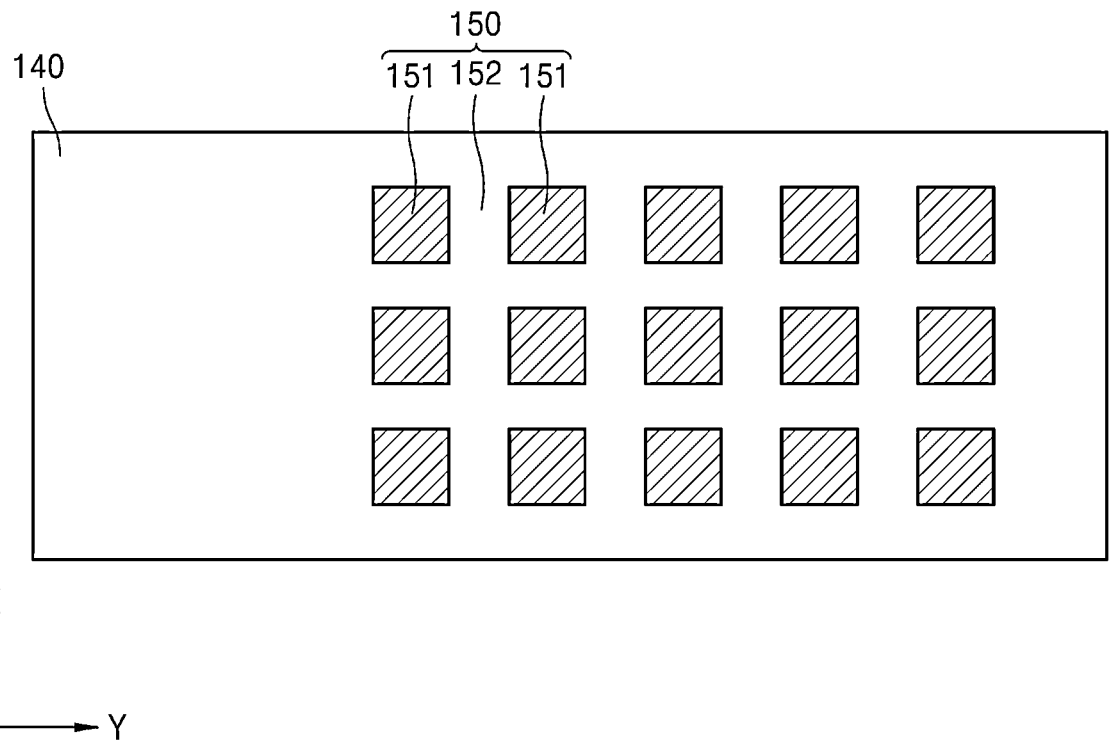
FIG. 5 is a diagram schematically illustrating a waveguide optical device according to another embodiment.

Referring to FIG. 5, the grating regions 151 of the output coupler 150 may be arranged to have a two-dimensional array structure. As described above, the uniformity of light in the X-direction and the Y-direction may be increased by arranging the grating regions 151 to be spaced apart from each other in a matrix structure.

Figure 6:
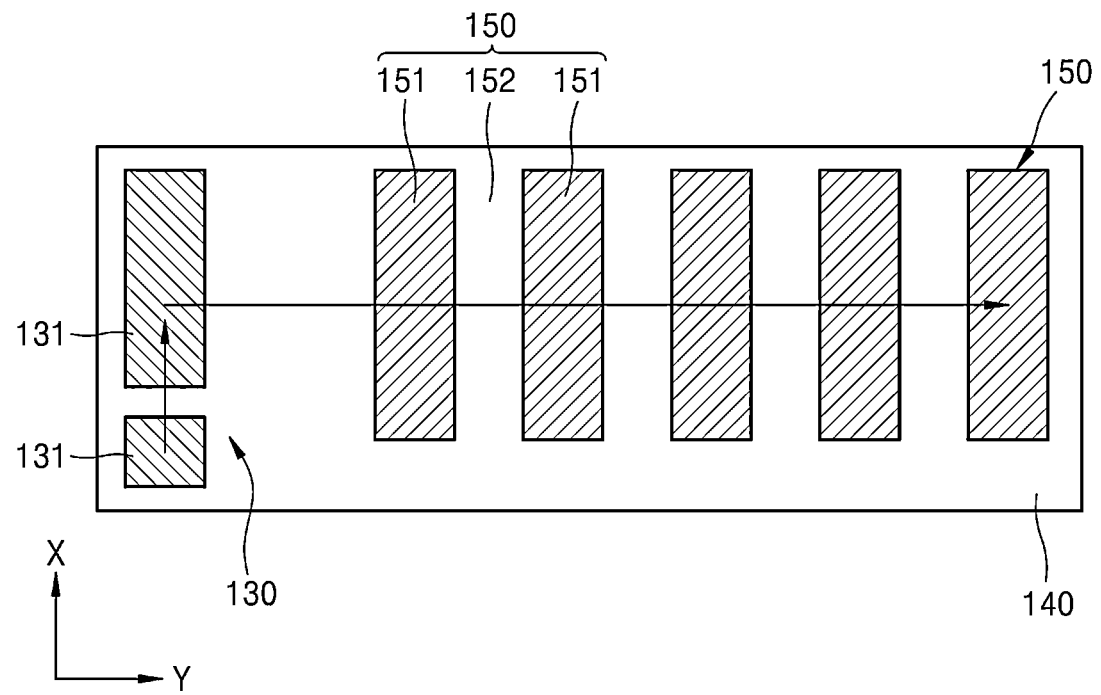
FIG. 6 is a diagram schematically illustrating a waveguide optical device in which grating regions of an input coupler are arranged to be spaced apart from each other.

Referring to FIG. 6, the input coupler 130 may include a plurality of grating regions 131. The grating regions 131 of the input coupler 130 may be spaced apart from each other in the X direction. The Y direction refers to the direction in which light is transferred through the waveguide 140, and the X direction refers to a direction perpendicular to the Y direction on a plane of the waveguide 140. As illustrated in FIG. 6, the input coupler 130 and the output coupler 150 may be arranged on the same surface. FIG. 6 illustrates an example in which the input coupler 130 includes two grating regions 131.

Figure 7:
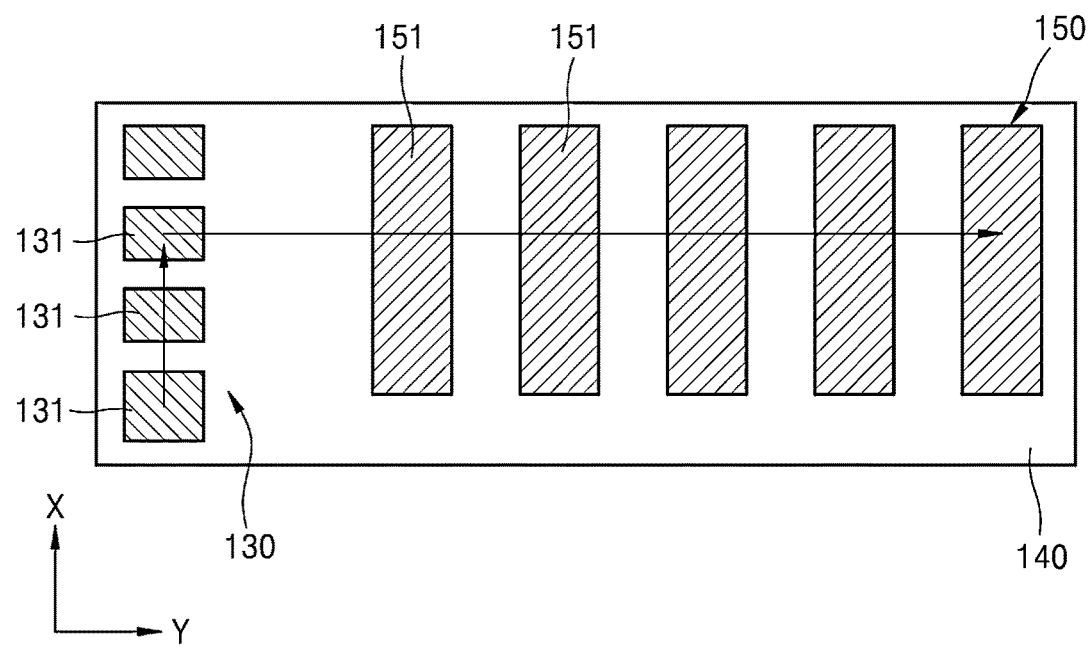
FIG. 7 is a diagram schematically illustrating a waveguide optical device in which grating regions of an input coupler are arranged to be spaced apart from each other.

Referring to FIG. 7, the input coupler 130 includes four grating regions 131, which are spaced apart from each other in the X direction. In this case, the uniformity of light in the X direction may be increased. The spacing or pitch between gratings may vary. In addition, the grating regions 151 of the output coupler 150 may be spaced apart from each other in the Y direction to increase the uniformity of light in the Y direction.

Figure 8:
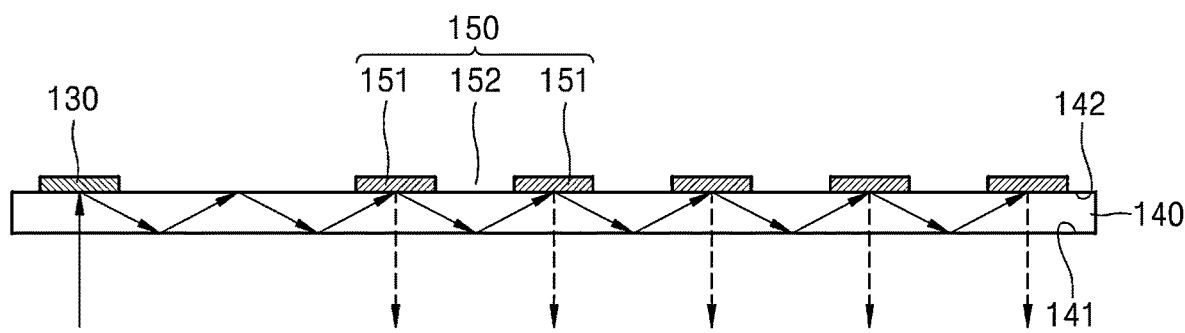
FIG. 8 is a diagram schematically illustrating a waveguide optical device having a structure in which an input coupler and an output coupler are arranged on the same surface of a waveguide.

FIG. 8 is a diagram illustrating an example in which the input coupler 130 and the output coupler 150 are provided together on the second surface 142 of the waveguide 140.

Figure 9A:
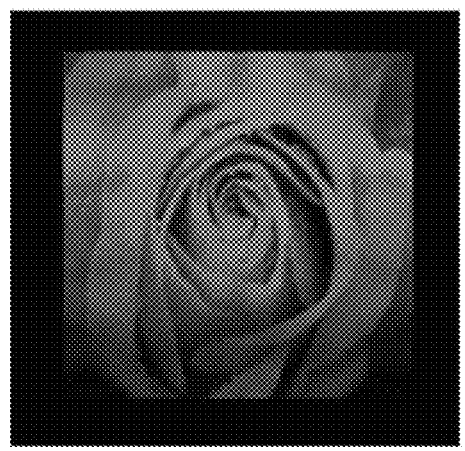
FIG. 9A shows an image displayed by a display apparatus according to a comparative example and FIG. 9B shows an image displayed by a display apparatus according to an example embodiment of the disclosure.
Figure 9B:
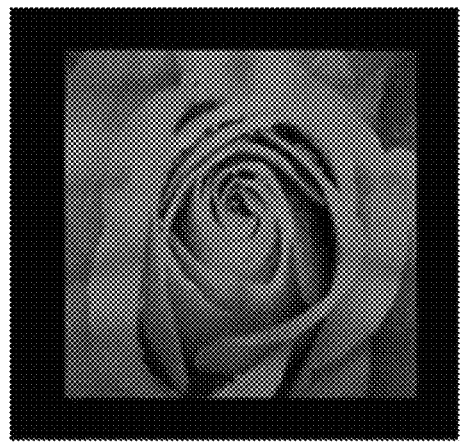

FIG. 9A shows an image displayed by a near-eye display apparatus in which an output coupler includes one grating region according to a comparative example, FIG. 9B shows an image displayed by a near-eye display apparatus in which an output coupler includes a plurality of grating regions according to an example embodiment. The uniformity of the image according to the example embodiment shown in FIG. 9B is relatively greater than that of the image according to the comparative example shown in FIG. 9A.

Figure 10:
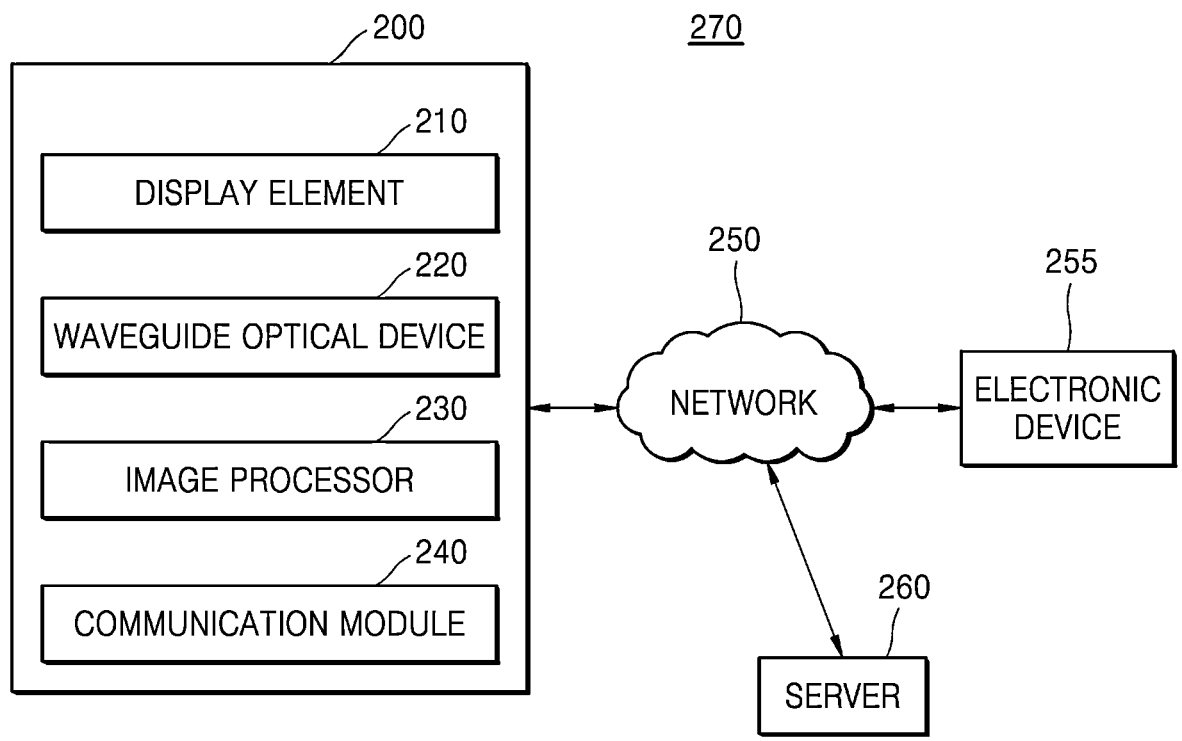
FIG. 10 is a block diagram of an electronic device including a waveguide optical device, according to an example embodiment.

FIG. 10 is a block diagram of an electronic device 200 including a waveguide optical device 220, according to an example embodiment. The electronic device 200 may include the waveguide optical device 220 according to an example embodiment. The electronic device 200 may be provided in a network environment 270. In the network environment 270, the electronic device 200 may communicate with another electronic device 255 (e.g., a smart phone), or with a server 260, through the network 250 (e.g., a short-range wireless communication network or a long-range wireless communication network).

The electronic device 200 may include a display element 210 for forming an image, the waveguide optical device 220 for propagating light transferred from the display element 210, and an image processor 230 for processing the image. In addition, the electronic device 200 may include a communication module 240 capable of communicating with the electronic device 255 or the server 260 through the network 250. The embodiments described with reference to FIGS. 1 to 9 may be applied to the waveguide optical device 220.

An image transmitted from the electronic device 255 may be received through the communication module 240 and displayed on a near-eye display apparatus through the waveguide optical device 220.

Figure 11:
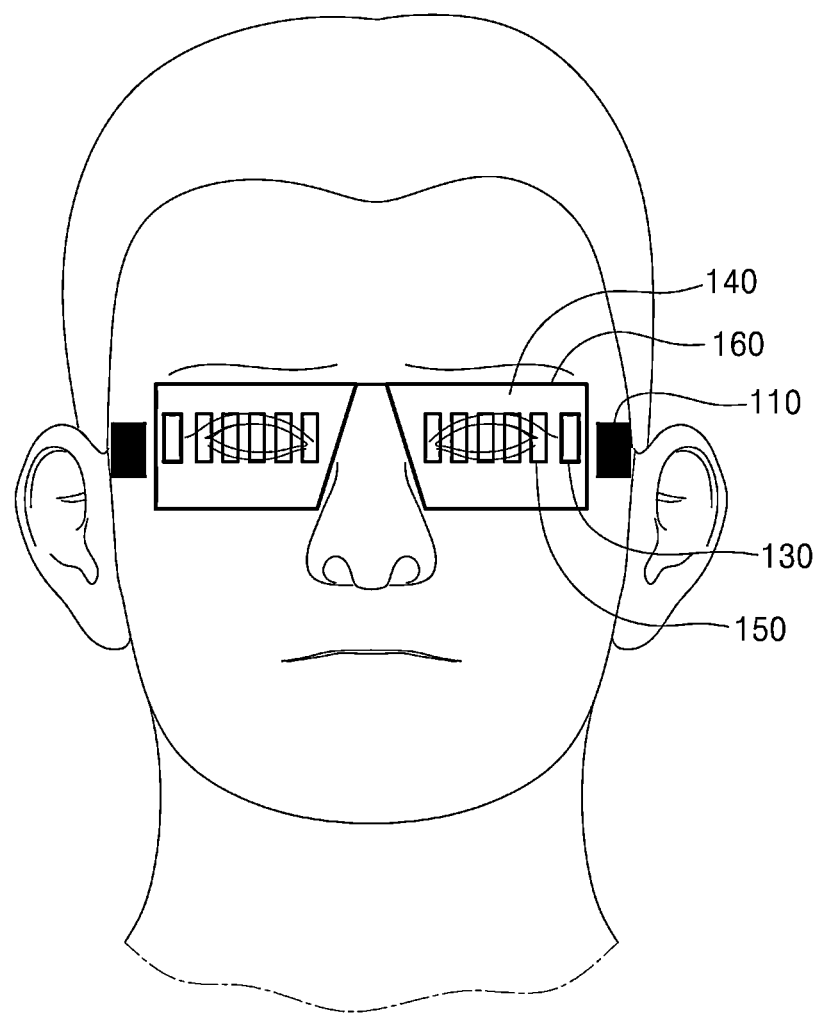
FIG. 11 is a diagram illustrating an example in which a user wears a near-eye display apparatus according to an example embodiment.

FIG. 11 is a diagram illustrating an example in which a user wears a near-eye display apparatus according to an example embodiment. The near-eye display apparatus may include the display element 110 that provides an image, a waveguide 140 that guides the image provided by the display element 110 to an eye of the user, and the input coupler 130 and the output coupler 150 provided in the waveguide 140. The waveguide 140, the input coupler 130, and the output coupler 150 may be provided in a lens portion 160.

Meanwhile, the image processor 230 may compensate for optical aberrations considering aberrations in respective positions of a virtual image by using a hologram generation algorithm using optimization.

The near-eye display apparatus according to an example embodiment may be applied to a virtual reality (VR) apparatus, an augmented reality (AR) apparatus, a mixed reality (MR) apparatus, a head-up display apparatus, etc. Virtual reality is a technology that enables people to experience an environment that they could hardly ever experience, as if they are actually interacting with an actual surrounding situation, and augmented reality is a technology that enhances virtual information in a real space in real time to enable a user to interact with the enhanced virtual information, thereby improving work efficiency. Mixed reality (MR) is a concept including VR and AR, and is to merge a real space with a virtual space to create a new space in which a real object and a virtual object interact with each other in real time. The combination of immersion, which is an advantage of VR, and reality, which is an advantage of AR, may be applied to various fields in various forms including a head-mounted display (HMD) and a smart glass.

In the waveguide optical device according to an example embodiment, grating regions of an output coupler are arranged to be spaced apart from each other, and accordingly, the uniformity of light transferred through a waveguide may be improved.

The near-eye display apparatus according to an example embodiment may provide an image having uniform image quality by increasing the uniformity of light.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims and their equivalents.

What is claimed is:

1. A waveguide optical device comprising:
   a waveguide comprising a first surface, and a second surface opposite to the first surface;
   an input coupler configured to input light into the waveguide; and
   an output coupler configured to output the light propagating in the waveguide to an outside,
   wherein the output coupler comprises a plurality of grating regions spaced apart from each other,
   wherein areas of the plurality of grating regions increase in a first direction, in which, the light propagates in the waveguide, and
   wherein the areas of the plurality of grating regions that output the light to the outside increase in the first direction, in which, the light propagates in the waveguide.

2. The waveguide optical device of claim 1, wherein the input coupler is provided on the first surface, and the output coupler is provided on the second surface.

3. The waveguide optical device of claim 1, wherein the plurality of grating regions are spaced apart from each other in a first direction, in which, the light propagates in the waveguide.

4. The waveguide optical device of claim 1, wherein each of the plurality of grating regions have a partially cut ring structure, and wherein the plurality of grating regions are spaced apart from each other to constitute a concentric semicircular arrangement structure.

5. The waveguide optical device of claim 1, wherein intervals between the plurality of grating regions are equal to each other.

6. The waveguide optical device of claim 1, wherein intervals between the plurality of grating regions decrease in the first direction, in which, the light propagates in the waveguide.

7. The waveguide optical device of claim 1, wherein the input coupler comprises a plurality of grating regions spaced apart from each other.

8. The waveguide optical device of claim 1, wherein the plurality of grating regions of the output coupler have a two-dimensional array structure.

9. The waveguide optical device of claim 1, wherein intervals between the plurality of grating regions of the output coupler are about 1 mm to about 5 mm.

10. A waveguide optical device comprising:
    a waveguide comprising a first surface, and a second surface opposite to the first surface;
    an input coupler configured to input light into the waveguide, which propagates the light in a first direction; and
    an output coupler configured to output the light propagating in the waveguide to an outside,
    wherein the output coupler comprises:
      a first region, which is a first grating regions;
      a second region adjacent to the first region in the first direction, the second region being a first non-grating region;
      a third region adjacent to the second region in the first direction, the third region being a second grating region; and
      a fourth region adjacent to the third region in the first direction, the fourth region being a second non-grating region,
    wherein a first area of the first grating region is smaller than a second area of the second grating region, and
    wherein the first area that outputs the light to the outside is smaller than the second area that outputs the light to the outside.

11. The waveguide optical device of claim 10, wherein a first diffraction efficiency of the first grating region is less than a second diffraction efficiency of the second grating region.

* * * * *